Feb. 13, 1962 J. H. MAKER 3,021,129
SPRING DEVICE
Original Filed Sept. 1, 1959

INVENTOR
JAMES H. MAKER

BY Scrivener & Parker
ATTORNEYS

United States Patent Office 3,021,129
Patented Feb. 13, 1962

3,021,129
SPRING DEVICE
James H. Maker, Bristol, Conn., assignor to Associated Spring Corporation, Bristol, Conn., a corporation of Delaware
Original application Sept. 1, 1959, Ser. No. 837,512. Divided and this application July 26, 1960, Ser. No. 45,318
1 Claim. (Cl. 267—1)

This application is a division of my co-pending application Serial No. 837,512, filed September 1, 1959 for Spring Device.

This invention relates to springs and spring devices and provides a compression spring device which produces substantially uniform loading about the circumference of its end convolutions and, most importantly, has a low rate throughout a considerable deflection. Although the invention is not limited to springs of any particular size or range of diameters, it has been found to be of great utility in application requiring springs of relatively large diameter and in which it is desirable to maintain parallel end surfaces, a condition known as "squareness under load," throughout a considerable range of deflections, and in applications in which, because of their flexibility, the springs tend to produce non-uniform loading about their end convolutions under varying temperature conditions or over a range of deflections.

It is often necessary to provide a substantially uniform resilient pressure over an annular member subjected to wide variations in temperature with consequent expansion and contraction of the metal parts. In known devices for producing such resilient pressure in a circular pattern an annular series of a plurality of helical compression springs is used, the outer ends of which engage a fixed or adjustable member. The springs of such an assembly are differentially responsive to variations in temperature and the assembly therefore produces uneven pressures about the annular member. In addition, such an annular assembly of a number of springs has marked disadvantages in cost, weight and space. Such an annular assembly of springs also has a relatively high rate, which is an undesirable characteristic in many applications. Further, it is often necessary or desirable to have a close degree of squareness under load, which is not achieved by the annular assembly of springs.

It is a particular object of this invention, therefore, to provide a single spring device which will take the place of the annular series of compression springs heretofore used for the described and similar purposes, which will exert substantially uniform pressure at all points about the circumference of its end convolutions, which will have a low rate of increase in load over a considerable range of deflection, and which will have a close degree of squareness under load.

The invention is described in the following specification and is illustrated in the accompanying drawing, in which.

Figure 1:
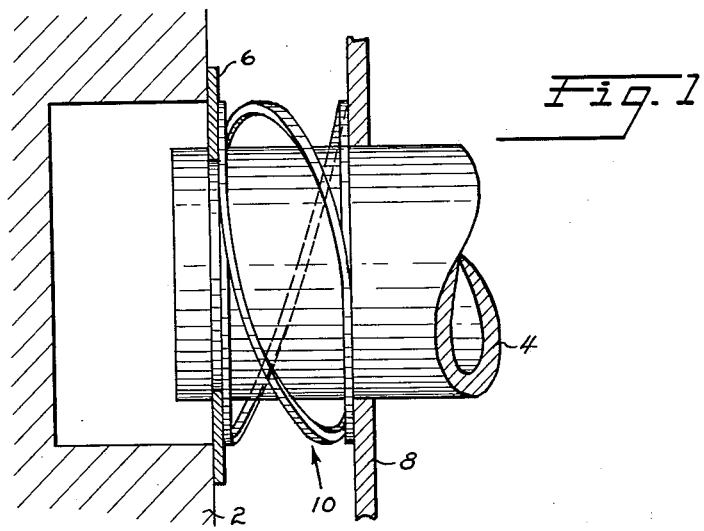
FIG. 1 is a side view, partly in section and partly in elevation, showing a spring device according to the invention, assembled to a sealing means.

In FIG. 1 of the drawings there is illustrated an assembly of parts including a spring device formed in accordance with this invention and providing new and improved results. This assembly comprises a hollow vessel 2 into which the end of a pipe or shaft 4 extends. An annular sealing member 6 surrounds the pipe or shaft and has one of its axial or end surfaces in face-to-face engagement with an end surface of the vessel 2 and its other axial or end surface spaced axially from a fixed abutment member 8. A compression spring device 10 which is constructed in accordance with this invention is disposed between and bears at its ends on the outer axial surface of the sealing member 6 and on the spaced surface of the fixed abutment 8 and surrounds the pipe or shaft 4. In present and known practice, in a typical assembly of this kind the part 4 is of large diameter, the sealing member 6, in accordance with known practice, is held against the vessel 2 by an annular series of small helical compression springs, and the entire assembly is heated in use to high temperatures and is subjected to very wide variations in temperature. The described assembly is, of course, only one of an almost infinite number of uses for a spring device as provided by the invention and is illustrated only by way of example.

The spring device 10 provided by the invention comprises a plurality of spring elements each of which is of helical shape and forms only part of a full convolution, and each of which acts in the normal manner of a compression spring when subjected to load in an axial direction. These helical spring elements are arranged concentrically about a common axis to form a cylindrical spring device and are equally circumferentially spaced and wound in the same direction. The spring elements are connected together at the inactive end of each element so that the active, helically shaped portions of the elements work in parallel and there is only one inactive convolution at each end of the assembly. The elements forming the spring device may be connected by welding, brazing, riveting, mechanical ties, or by any other suitable means.

Figure 2:
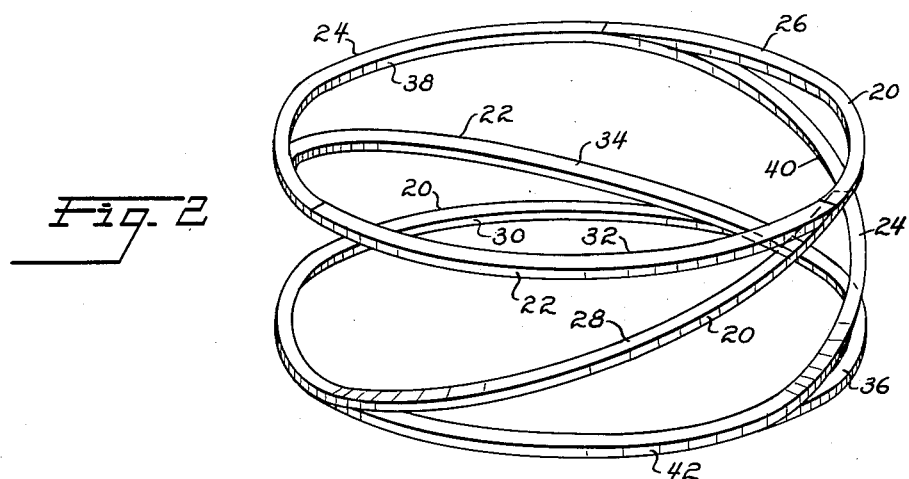
FIG. 2 is a perspective view of a spring device according to the invention.

One embodiment of the invention is disclosed in FIG. 2 and comprises a three-element spring device consisting of the helical elements 20, 22, 24 which have the same shape and are preferably equal in size in all dimensions. Element 20 of this assembly has a flat, arcuate end part 26 which extends through one-third of the circumference of the spring device at one end thereof, a second or intermediate part 28 which is a continuation of the flat end part 26 and which is shaped as a helix, and a second end part 30 which is flat and arcuate and extends throughout one-third of the circumference of the spring device at the second end thereof. The second element 22 is connected at its one end to the juncture of the flat part 26 and the intermediate part 28 of the element 20 and, extending from this end, has a flat, arcuate part 32 which forms an arcuate circular continuation of the flat part 26 of element 20 and extends through one-third of the circumference of the device, then a second or intermediate part 34 which is shaped as a helix, and then a flat, arcuate end part 36 which forms a circular continuation of the flat, arcuate end part 30 of element 20 and which extends throughout one-third of the circumference of the cylindrical assembly. The third element 24 is connected at its one end to the juncture of the flat part 32 and the intermediate, helical part 34 of element 22 and, extending from this end, has a flat, arcuate part 38 which forms a circular continuation of the arcuate, flat parts 26 and 32 of elements 20 and 22, respectively, and which extends through one-third of the circumference of the cylindrical assembly to complete the flat end member of the spring device at its one end. The third element 24 also has a helical intermediate part 40 which forms a continuation of the flat end part 38, and a second flat, arcuate end part 42 which forms a continuation of the helical part 40 and which extends throughout one-third of the circumference of the cylindrical assembly at the second end of the spring device, thus completing the flat end member at that end.

It will be seen that the described spring device, in the embodiment now being described, comprises the two circular, inactive end parts, one consisting of the flat, arcuate parts 26, 32, 38 of elements 20, 22, 24 and the other consisting of the flat, arcuate parts 30, 36, 42 of the same three elements. These flat, circular, inactive ends are connected by the three helically shaped convolutions 28, 34, 40 which form part of elements 20, 22, 24, respectively, and each of which extends from one inactive end coil of the spring device to the other and also extends throughout one-third of the circumference of the spring device, whereby each forms one-third of a full helical convolution. The helically shaped parts act separately and in combination with each other to resist axial loads exerted on the end members in approaching directions, whereby the entire device, and each of the three elements, acts as a compression spring. Because of the equal spacing and arrangement of the three spring elements the loading on both ends of the spring will be equal throughout the entire circumference, thus causing uniform loading. Thus, it will be seen in FIG. 1 that the flat end convolution of the spring device 10 will exert a uniform force throughout its circumference on the sealing member 6 regardless of variations in the temperatures to which the spring device is subjected, with consequent expansion or contraction of the parts, and regardless of variations in the normally parallel relation of the sealing ring 6 and the abutment 8. Further, the spring device 10 has a very low rate even under considerable deflection, such as that produced by movement of member 8 toward sealing ring 6.

Figure 3:
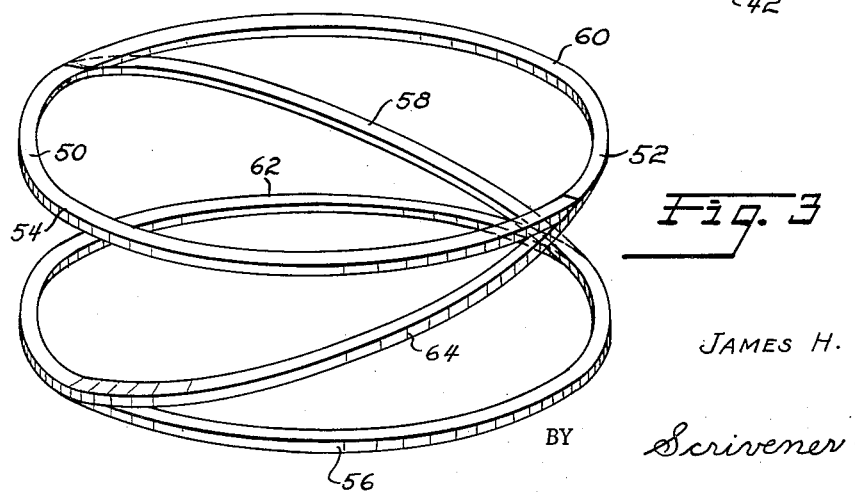
FIG. 3 is a perspective view showing a second embodiment of the invention.

A spring device according to the invention may include any number of helical spring elements and in FIG. 3 of the drawings there is disclosed an embodiment of the invention which is similar in all respects to that disclosed in FIG. 2 except that it has only two elements forming the spring parts and the inactive end parts of the device, instead of the three elements of the device of FIG. 2. Each of these two elements 50, 52 has an arcuate, flat end part at each end of the spring device, each of which parts extends throughout one-half of the circumference of the cylindrical device, and which end parts are connected by a helical member which may be of any arcuate length, i.e., it may extend through any angle, depending on the relative positions of the ends of the arcuate end parts. Thus, in the embodiment of the invention disclosed in FIG. 3 the element 50 has the two arcuate, flat end parts 54, 56, each of which extends through 180° and which are connected by the helical part 58. The member 52 has the two arcuate, flat end parts 60, 62 connected by the helical part 64. The two helical parts 58, 64 are of relatively short arcuate length in the embodiment illustrated in FIG. 4 because of the positioning of the ends of the flat end parts of the two members with respect to each other. The flat end parts 54, 60 of the two members are connected to form one circular end convolution of the spring device and at the other end of the device the two flat parts 56, 62 are connected to form an annular, inactive end coil. The device disclosed in this figure operates in exactly the same manner as that disclosed in FIG. 2.

While I have described and illustrated embodiments of the invention having either two or three spring elements, devices having four or more convolutions may be used within the purview of the invention. More than four elements decrease the efficiency of the device but might be used in some circumstances.

While I have described and illustrated several forms which my invention may take, it will be understood by those skilled in the art that other embodiments, as well as modifications of those disclosed, may be made and practiced without departing from the spirit or scope of the invention, for the limits of which reference must be made to the appended claim.

What is claimed is:

A spring device comprising a plurality of integral spring elements connected to form a cylindrical spring device having an annular member at each end thereof, each of said spring elements comprising a flat arcuate part at each end thereof and a helical part connecting said arcuate parts, the arcuate parts of said elements being connected at each end of the spring device to provide the annular member at that end and the helical parts of said elements being arranged in spaced circumferential relation to connect the annular end members of the spring device.

References Cited in the file of this patent

UNITED STATES PATENTS

| | | |
|---|---|---|
| 1,348,184 | Rayfield | Aug. 3, 1920 |
| 1,710,480 | Humphreys | Apr. 23, 1929 |

FOREIGN PATENTS

| | | |
|---|---|---|
| 284,014 | Great Britain | Jan. 23, 1928 |